United States Patent
Shiokawa et al.

(10) Patent No.: US 11,524,442 B2
(45) Date of Patent: Dec. 13, 2022

(54) APPARATUS AND METHOD FOR MANUFACTURING LIQUID CONTAINER

(71) Applicant: YOSHINO KOGYOSHO CO., LTD., Tokyo (JP)

(72) Inventors: Mitsuru Shiokawa, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 32 days.

(21) Appl. No.: 16/628,246

(22) PCT Filed: Jul. 5, 2018

(86) PCT No.: PCT/JP2018/025580
§ 371 (c)(1),
(2) Date: Jan. 2, 2020

(87) PCT Pub. No.: WO2019/026535
PCT Pub. Date: Feb. 7, 2019

(65) Prior Publication Data
US 2020/0171733 A1 Jun. 4, 2020

(30) Foreign Application Priority Data
Jul. 31, 2017 (JP) .............................. JP2017-148601

(51) Int. Cl.
*B29C 49/12* (2006.01)
*B29C 49/06* (2006.01)
(Continued)

(52) U.S. Cl.
CPC .............. *B29C 49/12* (2013.01); *B29C 49/06* (2013.01); *B29C 49/46* (2013.01); *B29C 49/58* (2013.01);
(Continued)

(58) Field of Classification Search
CPC ......... B29C 49/12; B29C 49/06; B29C 49/46; B29C 49/58; B29B 2911/14033; B29K 2067/003; B29L 2031/7158
See application file for complete search history.

(56) References Cited

U.S. PATENT DOCUMENTS

2016/0129621 A1* 5/2016 Lisch ...................... B29C 49/16
264/570

FOREIGN PATENT DOCUMENTS

EP 2902169 A1 8/2015
EP 3013554 A1 5/2016
(Continued)

OTHER PUBLICATIONS

Mar. 30, 2021 Extended European Search Report issued in European Patent Application No. 18840444.6.
(Continued)

*Primary Examiner* — Jeffrey M Wollschlager
*Assistant Examiner* — Shibin Liang
(74) *Attorney, Agent, or Firm* — Oliff PLC (57) ABSTRACT

An apparatus for manufacturing a liquid container, in which a nozzle unit has a seal body disposed in a supply path, the seal body has an annular first seal portion, an annular second seal portion and a spare supply path extending from a flow inlet located between the first seal portion and the second seal portion to a flow outlet located closer to a tip side of the seal body than the second seal portion, and the seal body can move between a blocked position where the first seal portion sits on the supply path, a spare supply position where the first seal portion separates from the supply path and the second seal portion sits on the supply path and an open position where the first seal portion separates from the supply path and the second seal portion separates from the supply path.

16 Claims, 7 Drawing Sheets

(51) Int. Cl.
    *B29C 49/46*   (2006.01)
    *B29C 49/58*   (2006.01)
    *B29K 67/00*   (2006.01)
    *B29L 31/00*   (2006.01)

(52) U.S. Cl.
    CPC .... *B29C 2949/26* (2022.05); *B29K 2067/003* (2013.01); *B29L 2031/7158* (2013.01)

(56) References Cited

FOREIGN PATENT DOCUMENTS

| | | | | |
|---|---|---|---|---|
| JP | 2016168801 A | * | 3/2015 | ............. B29C 49/46 |
| JP | 5806929 B2 | | 11/2015 | |
| JP | 2016-168801 A | | 9/2016 | |
| JP | 2016-527105 A | | 9/2016 | |
| JP | 2016-531769 A | | 10/2016 | |
| JP | 2018-069621 A | | 5/2018 | |

OTHER PUBLICATIONS

Oct. 2, 2018 International Search Report issued in International Patent Application No. PCT/JP2018/025580.

* cited by examiner

APPARATUS AND METHOD FOR MANUFACTURING LIQUID CONTAINER

TECHNICAL FIELD

The present disclosure relates to an apparatus and a method for manufacturing a liquid container containing a content liquid from a synthetic resin preform.

BACKGROUND

Synthetic resin containers, representatives of which are polypropylene (PP) bottles and polyethylene terephthalate (PET) bottles, are used in applications in which a variety of liquids such as beverages and toiletries including cosmetics, chemicals, detergents, shampoos or the like are contained as a content liquid. Such containers are generally manufactured by blow molding a preform formed by a thermoplastic synthetic resin material described above.

As the blow molding in which a preform is molded into a container, liquid blow molding is known, in which, as a pressurized medium supplied into a preform, a pressurized liquid is used instead of pressurized air.

For example, Patent Literature 1 (PTL 1) discloses a liquid blow molding method in which a synthetic resin preform heated in advance to a temperature at which stretchability is achieved is placed into a mold for blow molding and a liquid pressurized to a predetermined pressure by a pressure pump is supplied into the preform through a blow nozzle. In this manner the preform is molded into a container of a predetermined shape conforming to a cavity of the mold for blow molding.

In the above described liquid blow molding method, as a liquid supplied into a preform, a content liquid such as beverages or cosmetics contained finally in a container as a product is used, and molding of a container and filling of a content liquid are performed at the same time. In this manner a liquid container containing a content liquid can be manufactured. Therefore, according to the method for manufacturing a liquid container using the liquid blow molding described above, a step of filling a content liquid into a container after molding is omitted, and a liquid container can be manufactured at a low cost.

CITATION LIST

Patent Literature

PTL 1: JP5806929 (B2)

SUMMARY

Technical Problem

However, in the above described existing liquid blow molding method, a liquid as a pressurized medium is supplied into a preform while entraining the air present in the preform, thus foaming of the liquid may cause a decline of stability of the molding conditions and of moldability of a container, or the like.

The present disclosure has been conceived in view of the above described problem, and is to provide an apparatus and a method for manufacturing a liquid container in which a liquid container having a predetermined content volume and a shape can be manufactured precisely at a low cost.

Solution to Problem

A disclosed apparatus for manufacturing a liquid container includes a mold for blow molding and a nozzle unit and manufactures a liquid container containing a content liquid from a synthetic resin preform. The nozzle unit includes a nozzle unit body in which a liquid supply path is provided and a seal body disposed in the supply path. The seal body has an annular first seal portion, an annular second seal portion and a spare supply path extending from a liquid flow inlet located between the first seal portion and the second seal portion to a liquid flow outlet located closer to a tip side of the seal body than the second seal portion. The seal body can move, relative to the nozzle unit body, between a blocked position where the first seal portion sits on the supply path, a spare supply position where the first seal portion separates from the supply path and the second seal portion sits on the supply path and an open position where the first seal portion separates from the supply path and the second seal portion separates from the supply path.

In the disclosed apparatus for manufacturing a liquid container configured in the above described manner, it is preferable that the seal body has a seal main body and a tip member attachable to and detachable from the seal main body, and the spare supply path is provided to the tip member.

In the disclosed apparatus for manufacturing a liquid container configured in the above described manner, it is preferable that the nozzle unit has a stretching rod configured to stretch the preform in the axial direction, and that the spare supply path has a longitudinal flow path through which the stretching rod passes.

In the disclosed apparatus for manufacturing a liquid container configured in the above described manner, it is preferable that the spare supply path has a lateral flow path extending from the flow inlet to the longitudinal flow path, and that the stretching rod can move, in the retracting direction, to a position beyond a connecting point between the lateral flow path and the longitudinal flow path.

In the disclosed apparatus for manufacturing a liquid container configured in the above described manner, it is preferable that the nozzle unit has a blow nozzle that has an inner peripheral surface forming a lower end of the supply path and is configured to engage with a mouth of the preform, and that the inner peripheral surface of the blow nozzle is provided with an exhaust port configured to exhaust air out of the preform.

A disclosed method for manufacturing a liquid container is a method for manufacturing a liquid container by using the disclosed apparatus for manufacturing a liquid container. The method includes: an air exhaust step of exhausting air out of the preform by moving the seal body from the blocked position to the spare supply position to supply a liquid from the supply path into the preform placed in the mold for blow molding through the spare supply path; and a liquid blow molding step of molding the preform into a liquid container of a shape conforming to an inner surface of the mold for blow molding by moving the seal body from the spare supply position to the open position to supply a pressurized liquid from the supply path into the preform.

In the disclosed method for manufacturing a liquid container configured in the above described manner, it is preferable that the nozzle unit has a stretching rod configured to stretch the preform in the axial direction, and that the method further includes a rod stretching step of stretching the preform by the stretching rod in the axial direction before or during the liquid blow molding step.

In the disclosed method for manufacturing a liquid container configured in the above described manner, it is preferable that the nozzle unit has a blow nozzle that has an inner peripheral surface forming a lower end of the supply path and is configured to engage with a mouth of the preform, and that, in the air exhaust step, a liquid is supplied from the supply path into the preform placed in the mold for blow molding through the spare supply path by moving the seal body from the blocked position to the spare supply position with the blow nozzle of the nozzle unit engaged with the mouth of the preform to exhaust air out of the preform through an exhaust port provided in the inner peripheral surface of the blow nozzle.

Advantageous Effect

According to the present disclosure, an apparatus and a method for manufacturing a liquid container having a predetermined content volume and a shape can be manufactured precisely at a low cost can be provided.

DETAILED DESCRIPTION

The present disclosure will be described in more detail below with reference to drawings.

First, an apparatus 1 for manufacturing a liquid container according to an embodiment of the present disclosure will be illustrated with reference to FIGS. 1 to 7.

Figure 1:
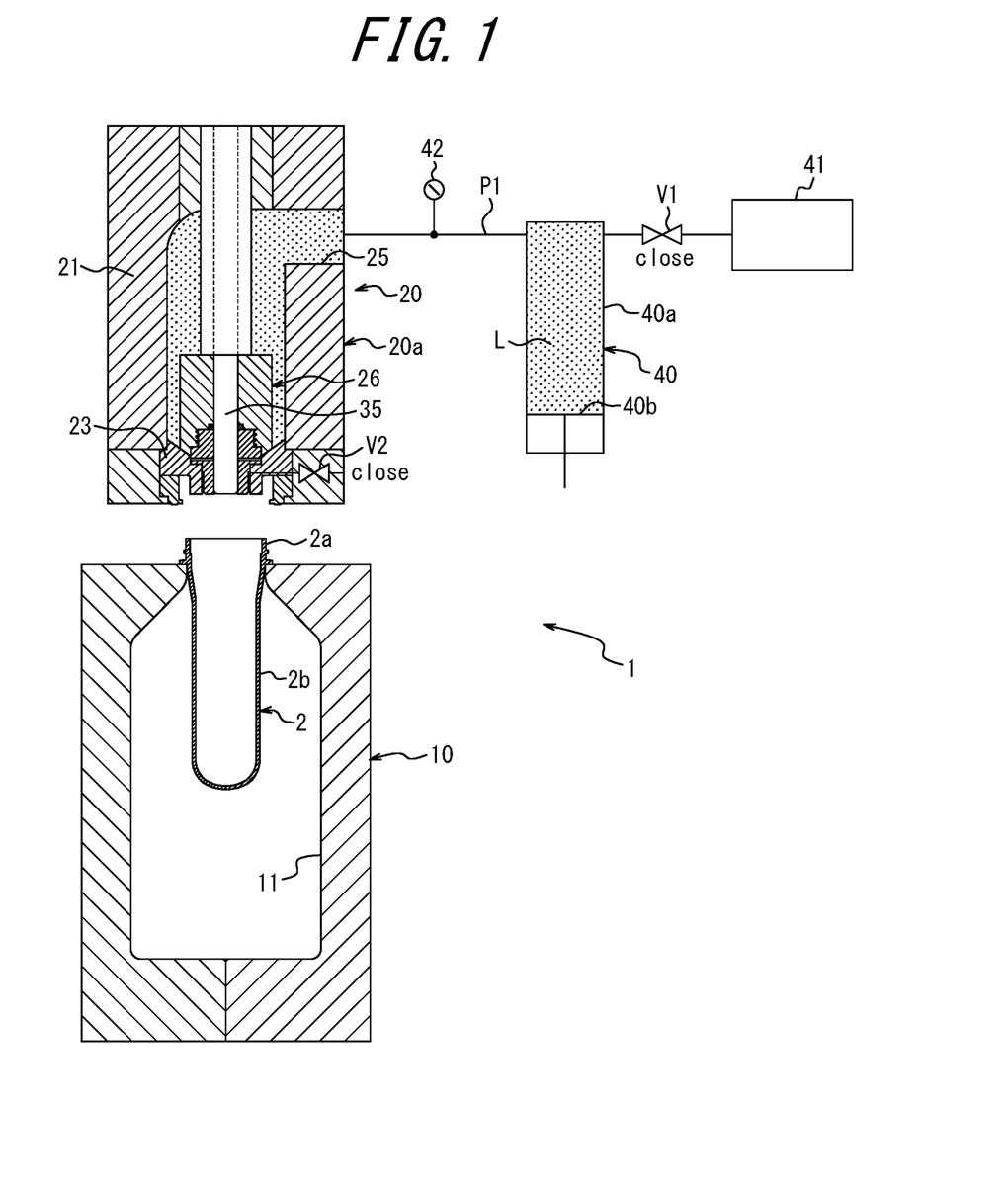
FIG. 1 is a diagram illustrating a liquid blow molding apparatus according to an embodiment of the present disclosure in which a preform is placed in a mold for blow molding.

The apparatus 1 for manufacturing a liquid container illustrated in FIG. 1 manufactures a liquid container C containing a content liquid (see FIG. 7) from a synthetic resin preform 2. As a liquid (content liquid) L contained in a liquid container C, a variety of liquids L such as, for example, beverages and toiletries including cosmetic products, pharmaceutical products, detergents and shampoo can be adopted.

As the preform 2, those formed, by a thermoplastic synthetic resin material such as polypropylene (PP) and polyethylene terephthalate (PET), for example, into a bottomed tubular shape including a cylindrical mouth 2a, which is an open end, and a cylindrical body 2b continuing to the mouth 2a and including a closed lower end can be used.

Although not illustrated in detail, on the outer wall surface of the mouth 2a is provided with an engaging protrusion used to mount a blocking cap (not illustrated) to the mouth 2a of the liquid container C after molding through plugging (undercut engagement). It is to be noted that, instead of the engaging protrusion, a male thread may be provided to the outer wall surface of the mouth 2a so as to mount the blocking cap to the mouth 2a through thread connection.

As illustrated in FIG. 1, the apparatus 1 for manufacturing a liquid container has a mold for blow molding 10. The mold for blow molding 10 has a cavity 11 of a shape corresponding to a final shape of a liquid container C such as a bottle shape, for example. The cavity 11 opens upward in the upper surface of the mold for blow molding 10. The preform 2 is placed in the mold for blow molding 10 with the body 2b disposed in the cavity 11 of the mold for blow molding 10 and with the mouth 2a protruded upward from the mold for blow molding 10.

The mold for blow molding 10 can be opened right and left. After the preform 2 is molded into a liquid container C, the liquid container C can be ejected from the mold for blow molding 10 by opening the mold for blow molding 10 right and left.

Above the mold for blow molding 10 is provided with a nozzle unit 20 configured to supply a pressurized liquid L into the preform 2. The nozzle unit 20 has a main body block 21.

Figure 2:
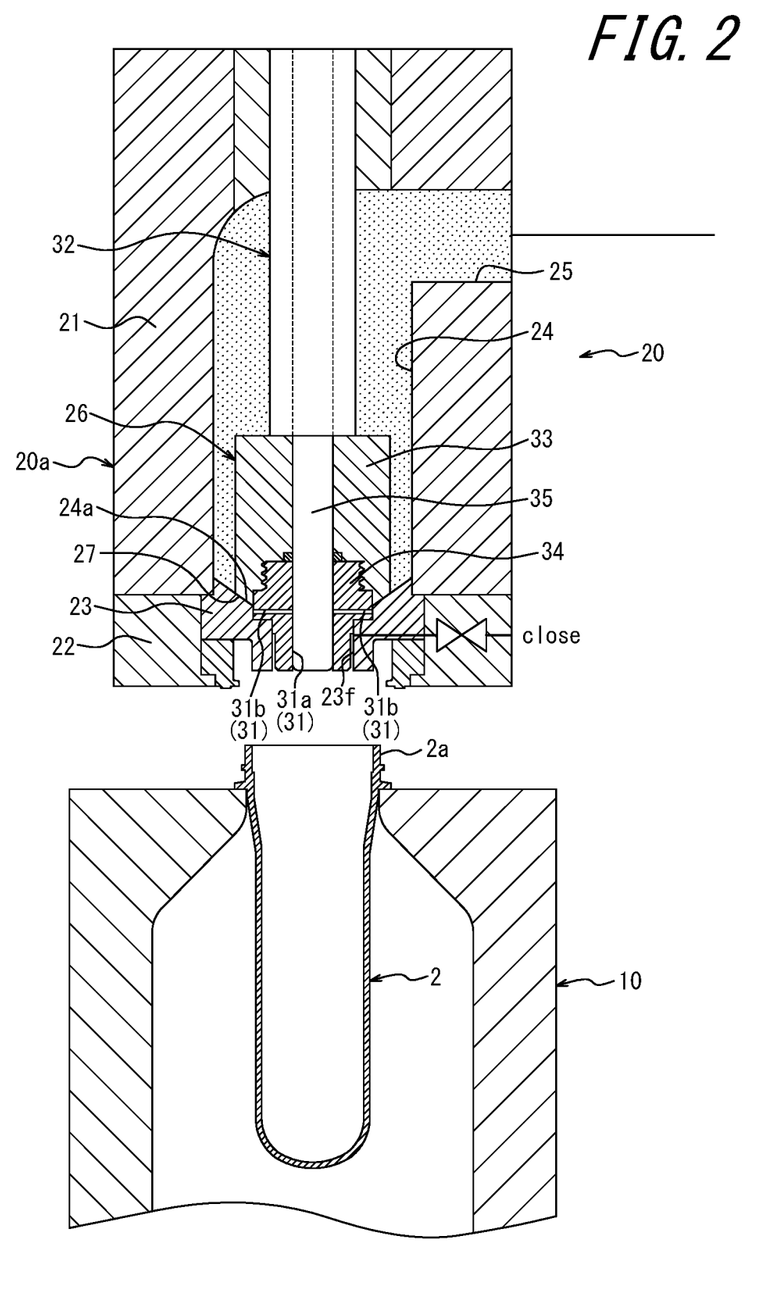
FIG. 2 is a partially enlarged view of FIG. 1.

As illustrated in FIG. 2, the lower end of the main body block 21 is provided with a support block 22, and a blow nozzle 23 is mounted to the lower end of the main body block 21 by being supported by the support block 22. The blow nozzle 23 is formed into a substantially cylindrical shape. The nozzle unit body 20a includes the main body block 21, the support block 22 and the blow nozzle 23. The nozzle unit body 20a is vertically movable relative to the mold for blow molding 10. When the nozzle unit body 20a is lowered to the stroke end on the lower side, the nozzle unit body 20a (in particular, the blow nozzle 23) engages, in a sealed manner, with the mouth 2a of the preform 2 placed in the mold for blow molding 10 from above.

A supply path 24 extending in the vertical direction is provided in the nozzle unit body 20a (in particular, the main body block 21 and the blow nozzle 23). The lower end of the supply path 24 includes a nozzle inner peripheral surface 23c of the blow nozzle 23. The nozzle unit body 20a (in particular, the main body block 21) is provided with a supply port 25 communicating with the upper end of the supply path 24.

Figure 5:
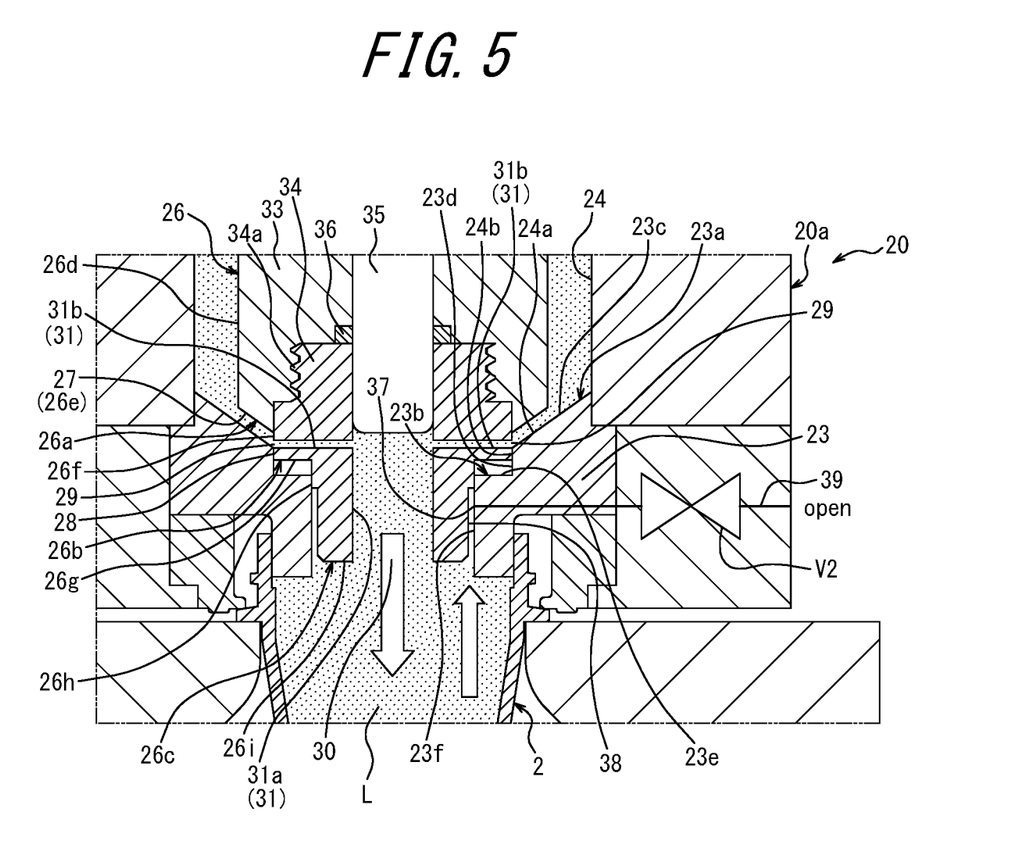
FIG. 5 is a partially enlarged view of FIG. 4.

As illustrated in FIG. 5, in this embodiment, the supply path 24 has an annular (toric) first seat 24a and an annular (toric) second seat 24b located downstream of the first seat 24a. The first seat 24a and the second seat 24b are formed by the blow nozzle 23. The blow nozzle 23 has a large inner diameter portion 23a and a small inner diameter portion 23b adjacent to the downstream side (lower side) of the large inner diameter portion 23a and having an inner diameter smaller than that of the large inner diameter portion 23a. The large inner diameter portion 23a has a large inner diameter portion upper surface 23c formed from an upper surface sloping downward in a conical manner and a large diameter inner peripheral surface 23d formed from an inner peripheral surface hanging down in parallel with an axial center of a seal body 26 from an inner peripheral edge of the large inner diameter portion upper surface 23c. The small inner diameter portion 23b has a small inner diameter portion upper surface 23e formed from an annular horizontal (possibly inclined) upper surface and a small diameter inner peripheral surface 23f formed from an inner peripheral surface hanging down in parallel with the axial center of the seal body 26 from the inner peripheral edge of the small inner diameter portion upper surface 23e. In this embodiment, the first seat 24a is formed from the large inner diameter portion upper surface 23c and the second seat 24b is formed from the large diameter inner peripheral surface 23d. The small inner peripheral surface 23f forms the lower end of the supply path 24. The shapes of the large inner diameter portion upper surface 23c, the large diameter inner peripheral surface 23*d*, the small inner diameter portion upper surface 23*e* and the small diameter inner peripheral surface 23*f* can be changed.

The seal body 26 is disposed in the supply path 24. The seal body 26 has an annular (toric) first seal portion 27 and an annular (toric) second seal portion 28. The seal body 26 has a spare supply path 31 extending from a liquid flow inlet 29 located between the first seal portion 27 and the second seal portion 28 to a liquid flow outlet 30 located closer to a tip side of the seal body 26 than the second seal portion 28. In this embodiment, the seal body 26 has a large outer diameter portion 26*a*, a medium outer diameter portion 26*b* adjacent to the downstream side (lower side) of the large outer diameter portion 26*a* and having an outer diameter smaller than that of the large outer diameter portion 26*a* and a small outer diameter portion 26*c* adjacent to the downstream side (lower side) of the medium outer diameter portion 26*b* and having an outer diameter smaller than that of the medium outer diameter portion 26*b*. The large outer diameter portion 26*a* has a large diameter outer peripheral surface 26*d* formed from an outer peripheral surface in parallel with the axial center of the seal body 26 and a large outer diameter portion lower surface 26*e* formed from a lower surface sloping downward in a conical manner. The large outer diameter portion lower surface 26*e* has an inclination that coincides with the large inner diameter portion upper surface 23*c* of the blow nozzle 23. In this embodiment, the first seal portion 27 is formed from the large outer diameter portion lower surface 26*e* that can sit on the first seat 24*a* (in a liquid-tight manner). The medium outer diameter portion 26*b* has a medium diameter outer peripheral surface 26*f* formed from an outer peripheral surface in parallel with the axial center of the seal body 26 and a medium outer diameter portion lower surface 26*g* formed from an annular horizontal (or inclined) lower surface. The second seal portion 28 is formed from (the lower end) of the medium diameter outer peripheral surface 26*f* that can sit on the second seat 24*b* (in a liquid-tight manner). The flow inlet 29 is provided (above the second seal portion 28) in the medium diameter outer peripheral surface 26*f*. The small outer diameter portion 26*c* has a small diameter outer peripheral surface 26*h* formed from an outer peripheral surface in parallel with the axial center of the seal body 26 and a small outer diameter portion lower surface 26*i* formed from an annular horizontal (or inclined) lower surface. The flow outlet 30 is provided in (the center of) the small outer diameter portion lower surface 26*i*. The shapes of the large outer diameter portion 26*a*, the medium outer diameter portion 26*b*, the small outer diameter portion 26*c*, the large diameter outer peripheral surface 26*d*, the large outer diameter portion lower surface 26*e*, the medium diameter outer peripheral surface 26*f*, the medium outer diameter portion lower surface 26*g*, the small diameter outer peripheral surface 26*h* and the small outer diameter portion lower surface 26*i* can be changed.

The seal body 26 can move relative to the nozzle unit body 20*a* between the blocked position (see FIG. 2) where the first seal portion 27 sits on the first seat 24*a* of the supply path 24 (in a liquid-tight manner), a spare supply position (see FIGS. 4 and 5) where the first seal portion 27 separates from the first seat 24*a* of the supply path 24 and the second seal portion 28 sits on the second seat 24*b* of the supply path 24 (in a liquid-tight manner), and an open position (see FIG. 6) where the first seal portion 27 separates from the first seat 24*a* of the supply path 24 and the second seal portion 28 separates from the second seat 24*b* of the supply path 24. The supply path 24 is blocked at the blocked position. The supply path 24 is opened only through the spare supply path 31 at the spare supply position. The supply path 24 is opened through a gap formed between the seal body 26 and the supply path 24 at the open position. In this embodiment, the supply path 24 is opened only through the gap at the open position. It is to be noted that, at the open position, the supply path 24 may be opened through both the gap and the spare supply path 31. As illustrated in FIG. 2, the seal body 26 is fixed to a shaft body 32 provided movable in the vertical direction relative to the nozzle unit body 20*a*, and can move in the vertical direction in the supply path 24. It is to be noted that the seal body 26 may be formed integrally with the shaft body 32.

The arrangement and the shape of the first seal portion 27 and/or the second seal portion 28 can be changed. For example, the first seal portion 27 may be formed from (the upper end of) the medium diameter outer peripheral surface 26*f* (see FIG. 5). In this case, both the first seat 24*a* and the second seat 24*b* are formed from the large diameter inner peripheral surface 23*d* (that is, the second seat 24*b* serves as the first seat 24*a*). The second seal portion 28 may be formed from the small diameter outer peripheral surface 26*h*. In this case, the second seat 24*b* is formed from the small diameter inner peripheral surface 23*f*. Further, in this case, the seal body 26 may not be provided with the medium outer diameter portion 26*b* (the flow inlet 29 is formed above the second seal portion 28 in the small diameter outer peripheral surface 26*h*). In this embodiment, the medium outer diameter portion lower surface 26*g* and the small inner diameter portion upper surface 23*e* may be configured to abut to each other or not to abut to each other with the seal body 26 located at the blocked position. When they are configured to abut to each other, it is preferable that the shape of the medium outer diameter portion lower surface 26*g* may be the same as that of the small inner diameter portion upper surface 23*e*. In this embodiment, the small diameter outer peripheral surface 26*h* and the small diameter inner peripheral surface 23*f* may be configured to abut to each other or not to abut to each other with the seal body 26 located at the blocked position. When they are configured to abut to each other, it is preferable that the small diameter outer peripheral surface 26*h* has the same shape as that of the small diameter inner peripheral surface 23*f* at the abutted portion. The seal body 26 may not be provided with the small outer diameter portion 26*c*.

As illustrated in FIG. 5, the seal body 26 has a seal main body 33 and a tip member 34 that is attachable to and detachable from the seal main body 33, and the spare supply path 31 is provided to the tip member 34. The medium diameter outer peripheral surface 26*f*, the medium outer diameter portion lower surface 26*g*, the small diameter outer peripheral surface 26*h* and the small outer diameter portion lower surface 26*i* of the seal body 26 are provided to the tip member 34. The large outer diameter portion lower surface 26*e* of the seal body 26 is provided to the seal main body 33. The tip member 34 has a screw portion 34*a* screwed onto the seal main body 33. Instead of the screw portion 34*a*, the tip member 34 may have, as an engaging portion that allows the tip member 34 to be attachable to and detachable from the seal main body 33, a fitting portion, for example. A seal ring 36 configured to seal between the stretching rod 35 and the seal body 26 is disposed between the seal main body 33 and the tip member 34.

As illustrated in FIG. 2, the nozzle unit 20 has the stretching rod 35 configured to stretch the preform 2 in the axial direction. The stretching rod 35 formed into a substantially columnar shape by steel and the like is inserted into the axial center of the shaft body 32, passes through the axial center of the seal main body 33 and extends through the longitudinal flow path 31a of the spare supply path 31. The stretching rod 35 is driven by a driving source not illustrated and can move in the vertical direction relative to the shaft body 32 and the seal body 26. The stretching rod 35 moves downward through the longitudinal flow path 31a and protrudes from the lower end of the seal body 26 such that the preform 2 can be stretched in the axial direction. However, the nozzle unit 20 may not have the stretching rod 35.

As illustrated in FIG. 5, the spare supply path 31 includes the longitudinal flow path 31a extending downward to the flow outlet 30 and a plurality of lateral flow paths 31b horizontally extending from the flow inlet 29 to the longitudinal flow path 31a in the radial direction. The lateral flow paths 31b may extend obliquely (preferably obliquely downward) from the flow inlet 29 to the longitudinal flow path 31a. The lateral flow paths 31b are disposed at equal angular intervals in the circumferential direction, for example. The number of the lateral flow paths 31b may not be limited to two or more, and may be one. The stretching rod 35 can move to a position beyond the connecting portion between the lateral flow path 31b and the longitudinal flow path 31a in the retracting direction (upward) (see FIGS. 4 and 5). In this embodiment, the stretching rod 35 moves to the position beyond the connecting portion between the lateral flow path 31b and the longitudinal flow path 31a in the retracting direction before, during or after the seal body 26 moves from the blocked position to the spare supply position. In this manner the longitudinal flow path 31a is opened and a liquid L is supplied from the longitudinal flow path 31a into the preform 2. However, it is also possible to provide a gap (e.g. an annular gap), between the stretching rod 35 and the longitudinal flow path 31a, through which the liquid L can pass, and the liquid L may be supplied into the preform 2 through the gap while the stretching rod 35 passes through the longitudinal flow path 31a. The shape of the spare supply path 31 is not limited to that having the longitudinal flow path 31a and the lateral flow path 31b, and may be changed.

As illustrated in FIG. 5, the small diameter inner peripheral surface 23f forming the inner peripheral surface of the blow nozzle 23 is provided with an exhaust port 37 configured to exhaust air out of the preform 2. A tip recess 38 formed from a recess extending from the tip portion of the seal body 26 to the base end side and provided continuously or intermittently in the circumferential direction is formed in the small diameter outer peripheral surface 26h of the seal body 26. Inside (the nozzle unit body 20a of) the nozzle unit 20 is provided with an exhaust flow path 39 configured to communicate the exhaust port 37 with the outside. The exhaust flow path 39 is provided with an opening-closing valve for exhaust V2. It is preferable that the opening-closing valve for exhaust V2 is a solenoid valve, and the air in the preform 2 can be exhausted to the outside through the tip recess 38, the exhaust port 37 and the exhaust flow path 39 by opening the opening-closing valve for exhaust V2. However, the nozzle unit 20 may not have the exhaust port 37.

As illustrated in FIG. 1, a pressurized liquid supply source 40 is connected to the supply port 25 through a pipe P1. The pressurized liquid supply source 40 may be a plunger pump that includes a cylinder 40a and a piston (plunger) 40b, for example.

A supply tank 41 is connected to the pressurized liquid supply source 40. The supply tank 41 can store a liquid L, heat the liquid L up to a predetermined temperature and keep the liquid L at the temperature. An opening-closing valve V1 is provided to a flow path between the pressurized liquid supply source 40 and the supply tank 41, and the flow path can be opened and closed by the opening-closing valve V1. It is to be noted that the reference sign 42 represents a pressure gauge provided to the pipe P1.

Figure 3:
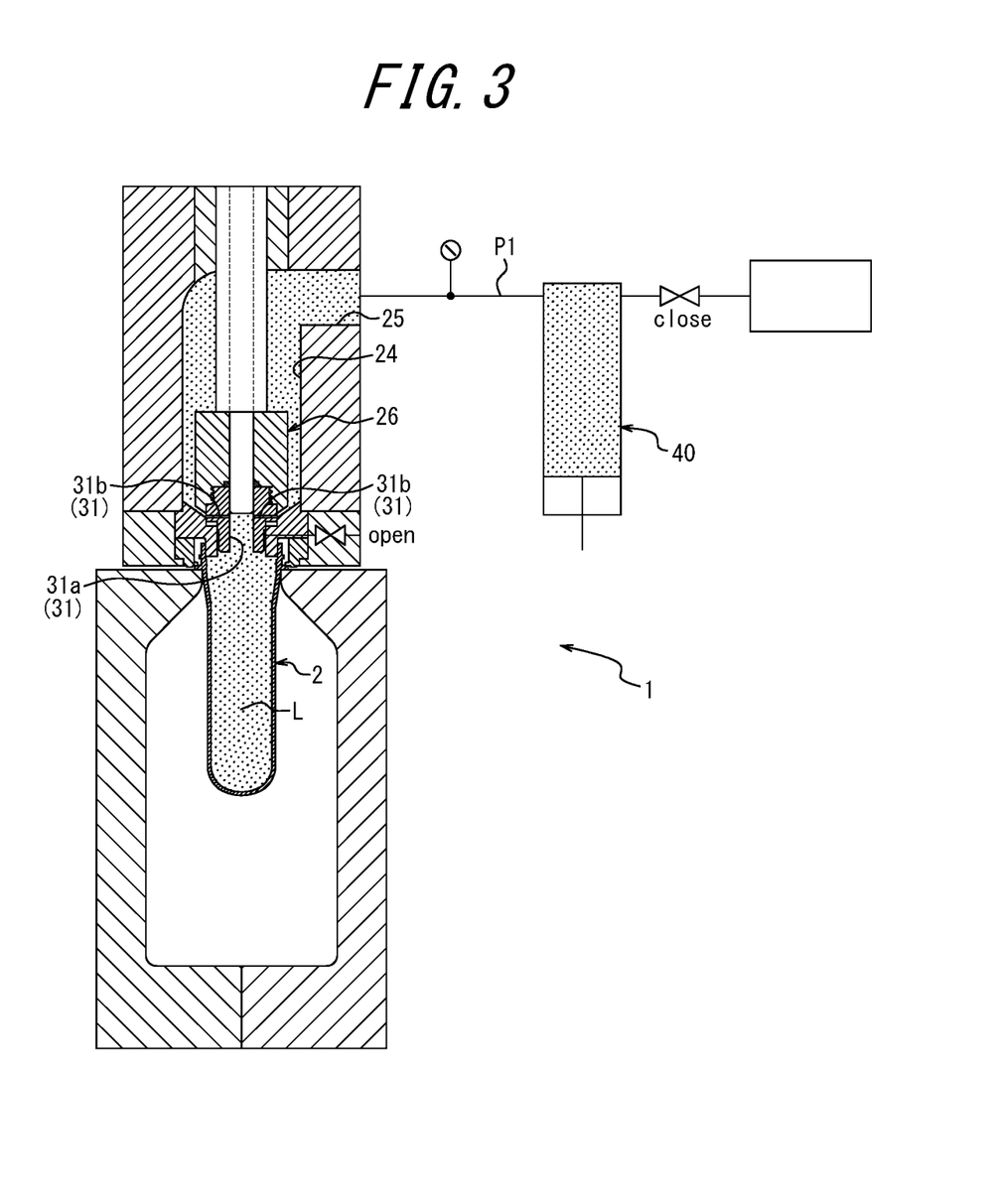
FIG. 3 is a diagram illustrating the liquid blow molding apparatus during an air exhaust step.
Figure 6:
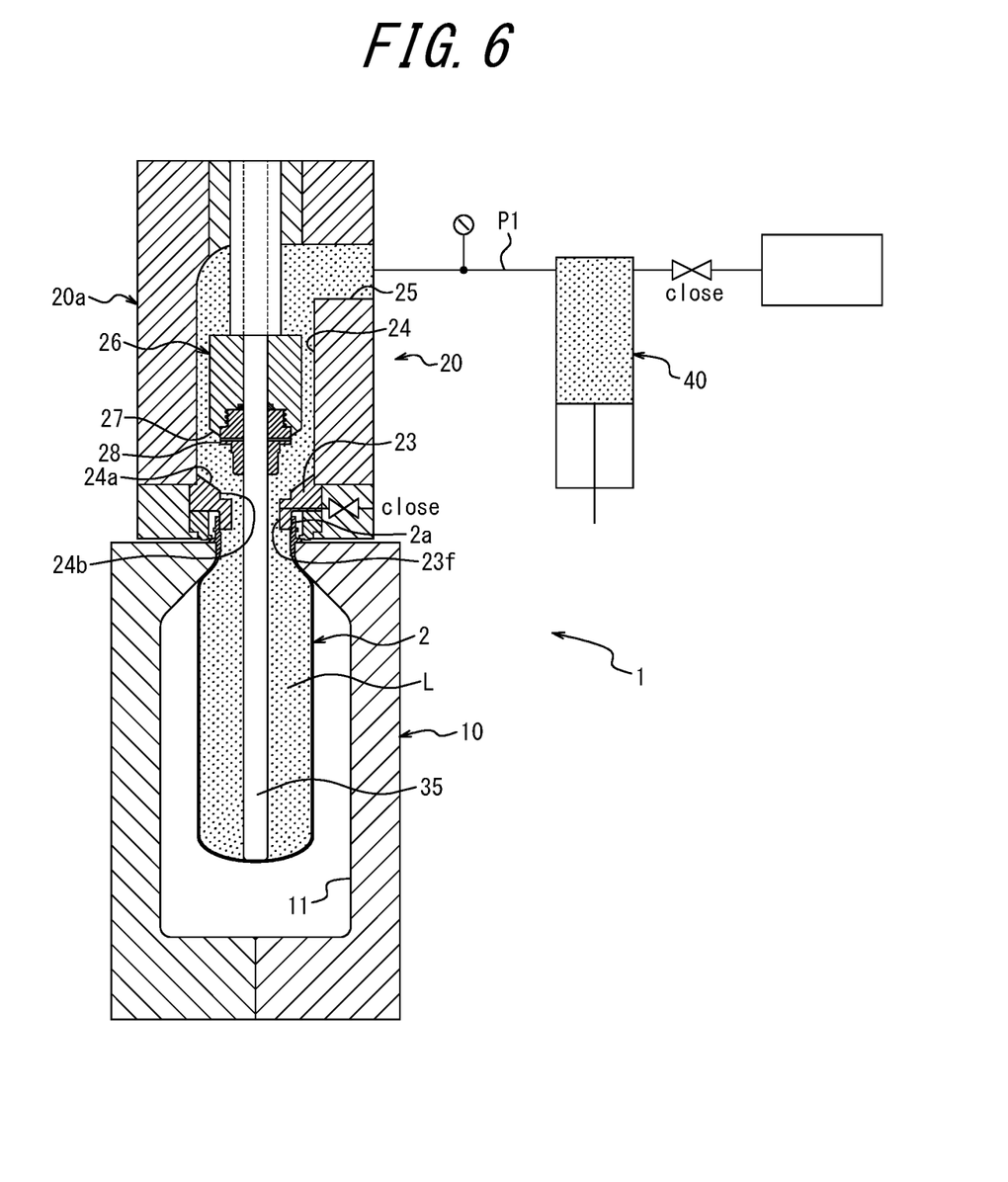
FIG. 6 is a diagram illustrating an apparatus for manufacturing a liquid container during a rod stretching step and a liquid blow molding step.
Figure 7:
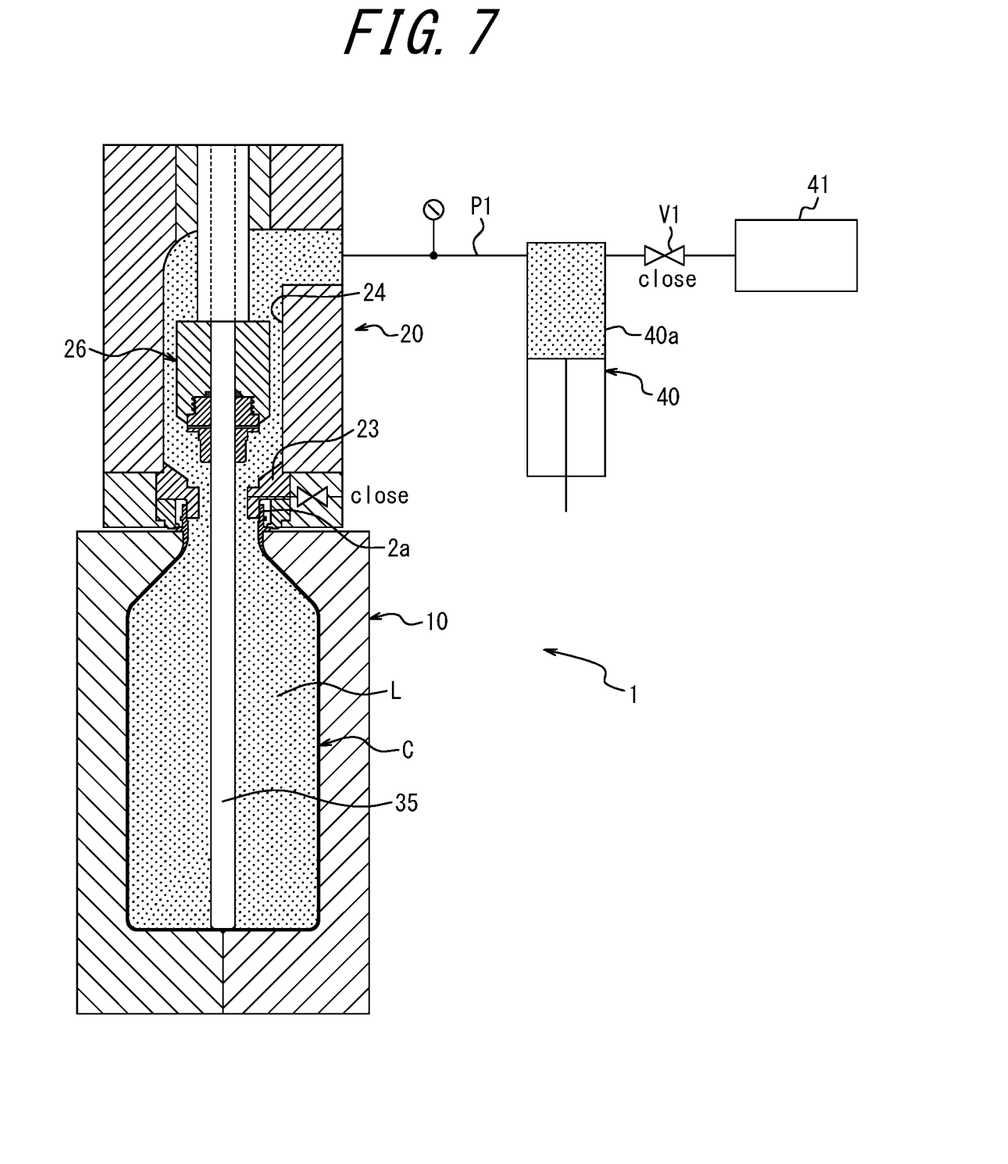
FIG. 7 is a diagram illustrating the apparatus for manufacturing a liquid container in a state where a liquid container is molded.

As illustrated in FIG. 6, the pressurized liquid supply source 40 can supply the liquid L pressurized to a predetermined pressure into the preform 2 through the pipe P1, the supply port 25 and (the small diameter inner peripheral surface 23f of) the supply path 24 by being operated in a positive direction (pressurized direction) in a state where the nozzle unit 20 (in particular the blow nozzle 23) is engaged with the mouth 2a of the preform 2 placed in the mold for blow molding 10 in a sealed manner and the seal body 26 is at an open position. The pressurized liquid supply source 40 may not be operated in the positive direction (pressurized direction) when the seal body 26 is at the spare supply position as illustrated in FIG. 3. In this case, a liquid L is supplied from the spare supply path 31 into the preform 2 only by gravity. The pressurized liquid supply source 40 may be operated in the positive direction (pressurized direction) in a state where the seal body 26 is at the spare supply position. In this case, a pressurized liquid L can be supplied into the preform 2 via the pipe P1, the supply port 25, the supply path 24 and the spare supply path 31. The pressure of the liquid L in this case may be smaller than the predetermined pressure described above.

The pressurized liquid supply source 40 operates in a reverse direction with the seal body 26 positioned at the blocked position and the opening-closing valve V1 open. In this manner, the liquid L stored in the supply tank 41 is sucked into the cylinder 40a to prepare for the next liquid blow molding.

Operation of the nozzle unit 20, the seal body 26, the stretching rod 35, the pressurized liquid supply source 40, the opening-closing valve V1, the opening-closing valve for exhaust V2 and the like are controlled by a controller (not illustrated) in an integrated manner. This control can be performed with reference to the values and the like of the pressure gauge 42. It is preferable that the opening-closing valve V1 may be provided as a solenoid valve that can be controlled by a controller.

Next, a method for manufacturing a liquid container according to an embodiment of the present disclosure will be illustrated.

The method for manufacturing a liquid container according to an embodiment of the present disclosure is a method for manufacturing a liquid container by using the apparatus 1 for manufacturing a liquid container according to the above described embodiment. The method includes: an air exhaust step of exhausting air out of the preform 2 by moving the seal body 26 from the blocked position to the spare supply position to supply a liquid L from the supply path 24 into the preform 2 placed in the mold for blow molding 10 through the spare supply path 31; and a liquid blow molding step of molding the preform 2 into a liquid container C of a shape conforming to an inner surface of the mold for blow molding 10 by moving the seal body 26 from the spare supply position to the open position to supply a pressurized liquid L from the supply path 24 into the preform 2.

In the method for manufacturing a liquid container according to this embodiment, the nozzle unit 20 has a stretching rod 35 configured to stretch the preform 2 in the axial direction, and the method further includes a rod stretching step of stretching the preform 2 in the axial direction by the stretching rod 35 before or during the liquid blow molding step.

In the method for manufacturing a liquid container according to this embodiment, the nozzle unit 20 has a blow nozzle 23 that has an inner peripheral surface (small diameter inner peripheral surface 23*f*) forming a lower end of the supply path 24 and is configured to engage with the mouth 2*a* of the preform 2, and in the air exhaust step, a liquid L is supplied from the supply path 24 into the preform 2 placed in the mold for blow molding 10 through the spare supply path 31 by moving the seal body 26 from the blocked position to the spare supply position with the blow nozzle 23 of the nozzle unit 20 engaged with the mouth 2*a* of the preform 2 to exhaust air out of the preform 2 through an exhaust port 37 provided in the inner peripheral surface of the blow nozzle 23.

However, the method for manufacturing a liquid container according to this embodiment may be performed by using an apparatus that is different from the apparatus 1 for manufacturing a liquid container according to this embodiment described above.

In the method for manufacturing a liquid container according to this embodiment, as illustrated in FIG. 1, first, the preform 2 is placed in the mold for blow molding 10 and is clamped, the preform 2 having been preheated to a predetermined temperature (e.g. from 80° C. to 150° C.) at which stretchability is achieved by using a heating means (not illustrated) such as a heater.

At this time, the nozzle unit 20 is located above the mold for blow molding 10 separated from the mold and the seal body 26 is located at the blocked position. Further, since the mouth 2*a* of the preform 2 is opened, inside the preform 2 is filled with the air.

Figure 4:
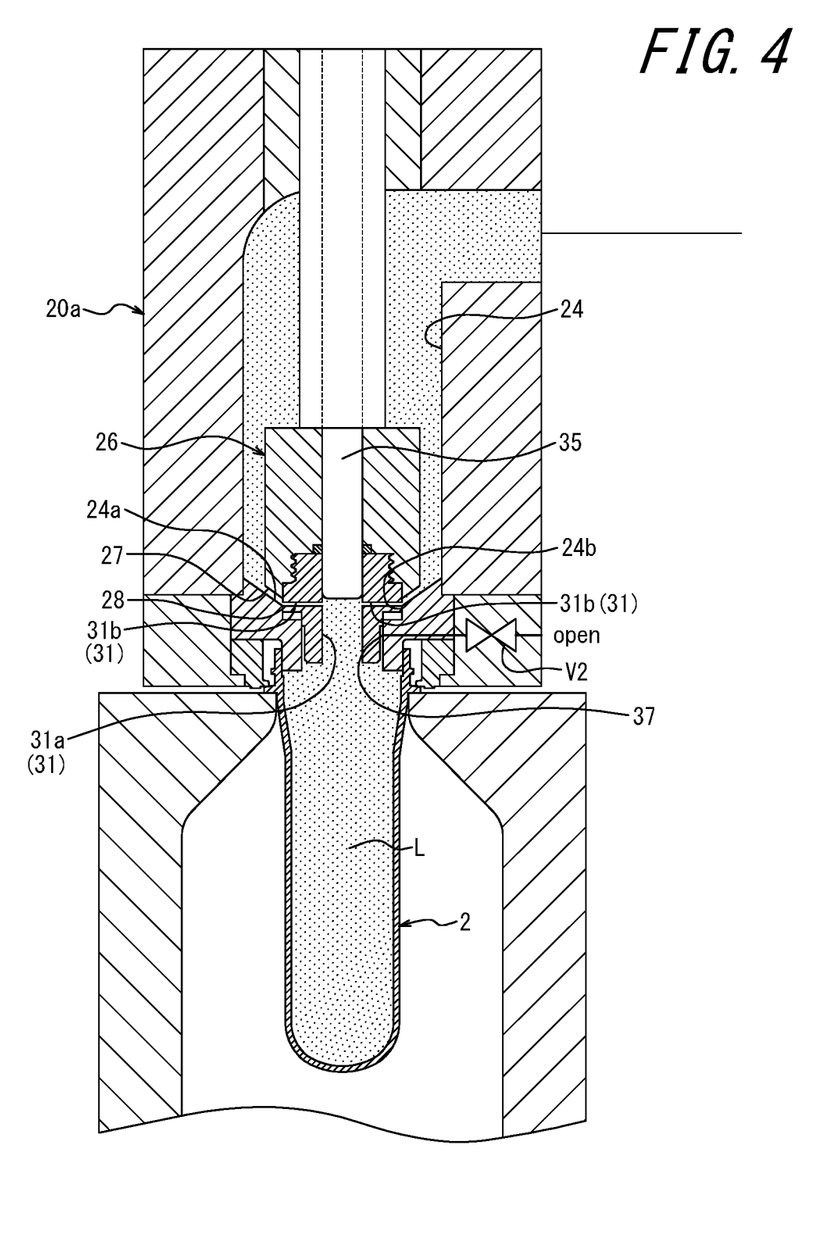
FIG. 4 is a partially enlarged view of FIG. 3.

Next the air exhaust step is performed. In the air exhaust step, first, the nozzle unit 20 is lowered to the position where the mouth 2*a* of the preform 2 is engaged with (the blow nozzle 23 of) the nozzle unit 20, and the opening-closing valve for exhaust V2 is opened. Next, as illustrated in FIG. 4, the seal body 26 is raised and moved from the blocked position to the spare supply position such that the spare supply path 31 is opened, and the liquid L is supplied from the spare supply path 31 into the preform 2 such that the air is exhausted out of the preform 2 through the exhaust port 37. That is, when the liquid L is supplied into the preform 2, most of the air filled in the preform 2 is pushed out by the liquid L and is exhausted. At this time, the liquid L is supplied with conditions (pressure and the like) under which the preform 2 is not substantially stretched (expanded). Exhaust of air is finished by closing the opening-closing valve for exhaust V2.

When the air exhaust step is finished, the liquid blow molding step is performed. In the liquid blow molding step, first, as illustrated in FIG. 6, the seal body 26 is raised and moved from the spare supply position to the open position. In this state the pressurized liquid supply source 40 is operated in the positive direction and a liquid L pressurized at a predetermined pressure is supplied into the preform 2 through the small diameter inner peripheral surface 23*f*. In this manner, a pressurized liquid L is supplied into the preform 2, and by the pressure of the liquid L, the preform 2 is molded into a liquid container C of a predetermined shape conforming to an inner surface of the cavity 11 of the mold for blow molding 10 (see FIG. 7).

In this context, since the liquid blow molding step is performed after most of the air in the preform 2 is exhausted to the outside in the air exhaust step, when a pressurized liquid L is supplied into the preform 2, the liquid L does not catch the air. In this manner, mixing of air into the liquid L in the liquid container C is prevented. Further, in the air exhaust step, a liquid L is supplied into the preform 2 only through the spare supply path 31 formed inside the seal body 26, not through the small diameter inner peripheral surface 23*f*. The circumferential length (of the longitudinal flow path 31*a*) of the spare supply path 31 when the liquid L is supplied from the spare supply path 31 can be shorter than the circumferential length of all over the open portion inside the small diameter inner peripheral surface 23*f* when the liquid L is supplied through the small diameter inner peripheral surface 23*f*. Further, the diameter dimension (of the longitudinal flow path 31*a*) of the spare supply path 31 when the liquid L is supplied from the spare supply path 31 can be smaller than that of all over the open portion inside the small diameter inner peripheral surface 23*f* when the liquid L is supplied through the small diameter inner peripheral surface 23*f*. In this manner, a liquid L is prevented from being biased in the circumferential direction when flowing in the spare supply path 31. Therefore, according to this embodiment, mixing of air from the open portion into the supply path 24 during supply of a liquid L in the air exhaust step can be prevented.

As with this embodiment, the rod stretching step can be performed during the liquid blow molding step. In the rod stretching step, the stretching rod 35 is moved forward in the downward direction such that the body 2*b* of the preform 2 is stretched by the stretching rod 35 in the axial direction (longitudinal direction). It is to be noted that the liquid blow molding step can be performed after the rod stretching step. A biaxial stretch blow molding in which a liquid blow molding is performed while the preform 2 is stretched by the stretching rod 35 in the axial direction can be performed by performing the liquid blow molding step after or during the rod stretching step (the rod stretching step may be started after the liquid blow molding step is started). In this manner the preform 2 can be molded into a liquid container C of a predetermined shape more precisely. It is preferable that the rod stretching step is performed after the air exhaust step. When the stretching rod 35 is moved forward before or during the air exhaust step, it is preferable that stretching of the preform 2 by the stretching rod 35 is started after the air exhaust step is finished. The liquid blow molding step may be performed without performing the rod stretching step.

After the liquid blow molding step, the seal body 26 is lowered and moved from the open position to the blocked position, and the nozzle unit 20 is moved upward relative to the mold for blow molding 10. Thus (the blow nozzle 23 of) the nozzle unit 20 is separated from (the mouth 2*a* of) the liquid container C. After the liquid blow molding step, an additional step for forming a headspace in the liquid container C (e.g. a suck back step in which the pressurized liquid supply source 40 is operated in a reverse direction (sucking direction) by a predetermined operation amount while the seal body 26 is located at the open position to suck back a predetermined amount of liquid L from the inside of the liquid container C after molding into the supply path 24) may be performed before the nozzle unit 20 is separated from the liquid container C. A finished liquid container C is ejected from the mold for blow molding 10 by opening the mold for blow molding 10, and a blocking cap is attached to the mouth 2*a* thereof. In this manner the finished liquid container C is provided as a product. At this time, the pressurized liquid supply source 40 is operated in the reverse direction with the opening-closing valve V1 open, and the liquid L stored in the supply tank 41 is sucked into the cylinder 40*a*. It is to be noted that the liquid container C may be ejected from the mold for blow molding 10 by opening the mold for blow molding after a blocking cap is attached to the mouth 2*a*.

As described above, in the apparatus 1 for manufacturing a liquid container according to this embodiment, the liquid blow molding step can be performed after the air is exhausted out of the preform 2 in the air exhaust step. Thus when a pressurized liquid L is supplied into the preform 2 in the liquid blow molding step, mixing of air in the liquid L can be prevented. According to the apparatus 1 for manufacturing a liquid container of this embodiment, a liquid L can be supplied into the preform 2 through the spare supply path 31 in the air exhaust step, and thus mixing of air into the supply path 24 during supply of the liquid L can be prevented. Further, according to the apparatus 1 for manufacturing a liquid container of this embodiment, the air exhaust step can be performed with a simple operation in which the seal body 26 is moved from the blocked position to the spare supply position. Therefore, according to this embodiment, a decline in stability of molding conditions and moldability of a container due to foaming of liquid L in the preform and mixing of air into the supply path 24 during the liquid blow molding is prevented, and thus a liquid container C having a predetermined content volume and a shape can be manufactured precisely at a low cost.

Further, in the apparatus 1 for manufacturing a liquid container according to this embodiment, the spare supply path 31 is provided to the tip member 34. Thus, a spare supply path 31 of a desired shape according to the molding conditions or the like can be provided to the seal body 26 by preparing a plurality of types of tip members 34 having a spare supply path 31 of a variety of shapes and changing the tip member 34 appropriately.

Further, in the apparatus 1 for manufacturing a liquid container according to this embodiment, since the passage of the stretching rod 35 serves also as (the longitudinal flow path 31*a* of) the spare supply path 31 in the seal body 26, a configuration for performing the air exhaust step can be simplified, and the cost for it can be decreased.

Further, in the apparatus 1 for manufacturing a liquid container according to this embodiment, since the stretching rod 35 is moved to a position beyond the connecting portion between the lateral flow path 31*b* and the longitudinal flow path 31*a* in the retracting direction in the air exhaust step, the longitudinal flow path 31*a* can be opened completely. Thus, compared with the case where an annular gap is formed between the longitudinal flow path 31*a* and the stretching rod 35, occurrence of biased flow of a liquid L in the circumferential direction in the spare supply path 31 can be further prevented. In this manner, according to this embodiment, mixing of air into the supply path 24 can be further prevented.

Further, in the apparatus 1 for manufacturing a liquid container according to this embodiment, since the blow nozzle 23 has the exhaust port 37, the air exhaust step can be performed with the blow nozzle 23 engaged with the mouth 2*a* of the preform 2. In this manner, according to this embodiment, possibility of a leakage of a liquid L in the air exhaust step can be reduced.

The present disclosure is not limited to the above described embodiment, and it is needless to say that various modifications may be made without departing from the spirit of the present disclosure.

For example, in the above described embodiment, the exhaust port 37 is provided to the blow nozzle 23, and the air exhaust step is performed with the blow nozzle 23 engaged with the mouth 2*a* of the preform 2, but it is not limited thereto. For example, the air exhaust step may be performed with the nozzle unit 20 lowered to the position immediately before the nozzle unit 20 is engaged with the preform 2 so as to secure a passage for exhausting air out of the preform 2.

In the above described embodiment, the seal body 26 includes the seal main body 33 and the tip member 34 that is attachable to and detachable from the seal main body 33, but is not limited thereto, and the seal main body 33 and the tip member 34 may be molded in an integral manner.

In the above described embodiment, the pressurized liquid supply source 40 is a plunger pump, but is not limited thereto, and a variety of types of pumps may be used as long as a liquid L can be pressurized to a predetermined pressure and supplied into the preform 2.

A preform 2 of a variety of shapes may be used according to a shape or the like of the liquid container C after molding.

REFERENCE SIGNS LIST

1 apparatus for manufacturing liquid container
2 preform
2*a* mouth
2*b* body
10 mold for blow molding
11 cavity
20 nozzle unit
20*a* nozzle unit body
21 main body block
22 support block
23 blow nozzle
23*a* large inner diameter portion
23*b* small inner diameter portion
23*c* large inner diameter portion upper surface
23*d* large diameter inner peripheral surface
23*e* small inner diameter portion upper surface
23*f* small diameter inner peripheral surface
24 supply path
24*a* first seat
24*b* second seat
25 supply port
26 seal body
26*a* large outer diameter portion
26*b* medium outer diameter portion
26*c* small outer diameter portion
26*d* large diameter outer peripheral surface
26*e* large outer diameter portion lower surface
26*f* medium diameter outer peripheral surface
26*g* medium outer diameter portion lower surface
26*h* small diameter outer peripheral surface
26*i* small outer diameter portion lower surface
27 first seal portion
28 second seal portion
29 flow inlet
30 flow outlet
31 spare supply path
31*a* longitudinal flow path
31*b* lateral flow path
32 shaft body
33 seal main body
34 tip member
34*a* screw portion
35 stretching rod
36 seal ring
37 exhaust port
38 tip recess 39 exhaust flow path
40 pressurized liquid supply source
40a cylinder
40b piston
41 supply tank
42 pressure gauge
C liquid container
L liquid
P1 pipe
V1 opening-closing valve
V2 opening-closing valve for exhaust

The invention claimed is:

1. An apparatus for manufacturing a liquid container comprising a mold for blow molding and a nozzle unit, the apparatus being configured to manufacture a liquid container containing a content liquid from a synthetic resin preform, wherein:
the nozzle unit includes a nozzle unit body in which a liquid supply path is provided and a seal body disposed in the supply path;
the seal body includes an annular first seal portion, an annular second seal portion and a spare supply path extending from a liquid flow inlet located between the first seal portion and the second seal portion to a liquid flow outlet located closer to a tip side of the seal body than the second seal portion;
the seal body is configured to move, relative to the nozzle unit body, between:
a blocked position where the first seal portion on contacts a first wall of the supply path to block the supply path,
a spare supply position where the first seal portion is separated from the first wall of the supply path and the second seal portion is in contact with a second wall of the supply path such that liquid can flow through the spare supply path, and
an open position where the first seal portion is separated from the first wall of the supply path and the second seal portion is separated from the second wall of the supply path such that liquid can flow through the supply path;
the nozzle unit includes a stretching rod configured to stretch the preform in an axial direction;
the spare supply path includes: a longitudinal flow path through which the stretching rod is configured to pass, and a lateral flow path extending from the liquid flow inlet to the longitudinal flow path;
the stretching rod can move, in a retracting direction, to a position beyond a connecting portion between the lateral flow path and the longitudinal flow path; and
when the seal body is in the blocked position, the spare supply path is not opened by movement of the stretching rod in the retracting direction to a position beyond the connecting portion between the lateral flow path and the longitudinal flow path.

2. The apparatus according to claim 1, wherein
the nozzle unit includes a blow nozzle that has an inner peripheral surface forming a lower end of the supply path and is configured to engage with a mouth of the preform; and
the inner peripheral surface of the blow nozzle is provided with an exhaust port configured to exhaust air out of the preform.

3. The apparatus according to claim 1, wherein:
the seal body includes a seal main body and a tip member attachable to and detachable from the seal main body; and
the spare supply path is provided in the tip member.

4. The apparatus according to claim 3, wherein a seal ring configured to seal between the stretching rod and the seal body is disposed between the seal main body and the tip member.

5. An apparatus for manufacturing a liquid container comprising a mold for blow molding and a nozzle unit, the apparatus being configured to manufacture a liquid container containing a content liquid from a synthetic resin preform, wherein:
the nozzle unit includes a nozzle unit body in which a liquid supply path is provided and a seal body disposed in the supply path;
the seal body includes an annular first seal portion, an annular second seal portion, and a spare supply path extending from a liquid flow inlet located between the first seal portion and the second seal portion to a liquid flow outlet located closer to a tip side of the seal body than the second seal portion;
the seal body is configured to move, relative to the nozzle unit body, between:
a blocked position where the first seal portion sits on a first seat of the supply path to block the supply path,
a spare supply position where the first seal portion is separated from the first seat of the supply path and the second seal portion abuts a second seat of the supply path such that liquid can flow through the spare supply path, and
an open position where the first seal portion is separated from the first seat of the supply path and the second seal portion is separated from the second seat of the supply path such that liquid can flow through the supply path;
the nozzle unit includes a stretching rod configured to stretch the preform in an axial direction;
the spare supply path includes: a longitudinal flow path through which the stretching rod is configured to pass, and a lateral flow path extending from the liquid flow inlet to the longitudinal flow path;
the stretching rod can move, in a retracting direction, to a position beyond a connecting portion between the lateral flow path and the longitudinal flow path; and
the lateral flow path of the spare supply path is blocked by the second seat when the seal body is in the blocked position.

6. The apparatus according to claim 5, wherein:
the seal body includes a seal main body and a tip member attachable to and detachable from the seal main body; and
the spare supply path is provided in the tip member.

7. The apparatus according to claim 6, wherein a seal ring configured to seal between the stretching rod and the seal body is disposed between the seal main body and the tip member.

8. The apparatus according to claim 5, wherein:
the nozzle unit includes a blow nozzle that has an inner peripheral surface forming a lower end of the supply path and is configured to engage with a mouth of the preform; and
the inner peripheral surface of the blow nozzle is provided with an exhaust port configured to exhaust air out of the preform.

9. A method for manufacturing a liquid container by using the apparatus according to claim 1, the method comprising:
an air exhaust step of exhausting air out of the preform by moving the seal body from the blocked position to the spare supply position to supply a liquid from the supply path into the preform placed in the mold for blow molding through the spare supply path; and a liquid blow molding step of molding the preform into a liquid container of a shape conforming to an inner surface of the mold for blow molding by moving the seal body from the spare supply position to the open position to supply a pressurized liquid from the supply path into the preform.

10. The method according to claim 9, further comprising a rod stretching step of stretching the preform by the stretching rod in the axial direction before or during the liquid blow molding step.

11. The method according to claim 9, wherein the nozzle unit includes a blow nozzle that has an inner peripheral surface forming a lower end of the supply path and is configured to engage with a mouth of the preform; and in the air exhaust step, a liquid is supplied from the supply path into the preform placed in the mold for blow molding through the spare supply path by moving the seal body from the blocked position to the spare supply position with the blow nozzle of the nozzle unit engaged with the mouth of the preform to exhaust air out of the preform through an exhaust port provided in the inner peripheral surface of the blow nozzle.

12. The method according to claim 7, wherein the nozzle unit includes a blow nozzle that has an inner peripheral surface forming a lower end of the supply path and is configured to engage with a mouth of the preform; and in the air exhaust step, a liquid is supplied from the supply path into the preform placed in the mold for blow molding through the spare supply path by moving the seal body from the blocked position to the spare supply position with the blow nozzle of the nozzle unit engaged with the mouth of the preform to exhaust air out of the preform through an exhaust port provided in the inner peripheral surface of the blow nozzle.

13. A method for manufacturing a liquid container by using the apparatus according to claim 5, the method comprising:

an air exhaust step of exhausting air out of the preform by moving the seal body from the blocked position to the spare supply position to supply a liquid from the supply path into the preform placed in the mold for blow molding through the spare supply path; and a liquid blow molding step of molding the preform into a liquid container of a shape conforming to an inner surface of the mold for blow molding by moving the seal body from the spare supply position to the open position to supply a pressurized liquid from the supply path into the preform.

14. The method according to claim 13, further comprising a rod stretching step of stretching the preform by the stretching rod in the axial direction before or during the liquid blow molding step.

15. The method according to claim 13, wherein the nozzle unit includes a blow nozzle that has an inner peripheral surface forming a lower end of the supply path and is configured to engage with a mouth of the preform; and in the air exhaust step, a liquid is supplied from the supply path into the preform placed in the mold for blow molding through the spare supply path by moving the seal body from the blocked position to the spare supply position with the blow nozzle of the nozzle unit engaged with the mouth of the preform to exhaust air out of the preform through an exhaust port provided in the inner peripheral surface of the blow nozzle.

16. The method according to claim 14, wherein the nozzle unit includes a blow nozzle that has an inner peripheral surface forming a lower end of the supply path and is configured to engage with a mouth of the preform; and in the air exhaust step, a liquid is supplied from the supply path into the preform placed in the mold for blow molding through the spare supply path by moving the seal body from the blocked position to the spare supply position with the blow nozzle of the nozzle unit engaged with the mouth of the preform to exhaust air out of the preform through an exhaust port provided in the inner peripheral surface of the blow nozzle.

* * * * *